United States Patent [19]

Sullivan et al.

[11] Patent Number: 5,388,232
[45] Date of Patent: Feb. 7, 1995

[54] METHOD AND SYSTEM FOR PROVIDING SUCCESSIVE DATA TRANSFERS AMONG DATA PROCESSING UNITS IN A NON-MULTIPLEXED ASYNCHRONOUS MANNER USING UNIQUE PIPELINED ARBITRATION, ADDRESS, AND DATA PHASE OPERATIONS

[75] Inventors: Timothy J. Sullivan, Clinton; Ralph C. Frangioso, Jr., Franklin; Mark A. DesMarais, Northboro; Lawrence L. Krantz, Marlborough, all of Mass.

[73] Assignee: Data General Corporation, Westboro, Mass.

[21] Appl. No.: 291,836

[22] Filed: Aug. 17, 1994

Related U.S. Application Data

[63] Continuation of Ser. No. 29,884, Mar. 11, 1993, abandoned.

[51] Int. Cl.[6] ............ G06F 13/14; G06F 13/36; G06F 9/46
[52] U.S. Cl. ............ 395/325; 395/800; 364/229; 364/229.2; 364/230; 364/230.4; 364/240; 364/240.1; 364/241.2; 364/242.6; 364/242.92; 364/DIG. 1
[58] Field of Search ............ 395/325, 725, 275; 340/825.5, 825.51; 370/60, 85.2, 85.6

[56] References Cited

U.S. PATENT DOCUMENTS

| | | | |
|---|---|---|---|
| 4,656,627 | 4/1987 | Hasley et al. | 370/60 |
| 4,817,084 | 3/1989 | Arthurs et al. | 370/60 |
| 4,864,291 | 9/1989 | Korpi | 340/825.5 |
| 5,129,090 | 7/1992 | Bland et al. | 395/725 |
| 5,179,705 | 1/1993 | Kent | 395/725 |
| 5,249,297 | 9/1993 | Brockmann et al. | 395/725 |
| 5,261,105 | 11/1993 | Potter et al. | 395/725 |
| 5,287,463 | 2/1994 | Frame et al. | 395/325 |
| 5,287,537 | 2/1994 | Newmark et al. | 395/800 |
| 5,301,329 | 4/1994 | Frame et al. | 395/725 |

OTHER PUBLICATIONS

"Futurebus+8 p896.1: Logical Layer Specifications P896.1/Draft 8.3.3", Dec. 26, 1990, Institute of Eledtrical and Electronic Engineers, Inc.
"Tagged Inter Processor Communication Bus for Multiprocessor Systems", IBM Technical Disclosure Bulletin, vol. 34 No. 3, Aug. 1991.
"High-Performance Multiplexed Bus Structure", IBM Technical Disclosure Bulletin, vol. 34, No. 7A, Dec. 1991.

*Primary Examiner*—Gopal C. Ray
*Attorney, Agent, or Firm*—Robert F. O'Connell

[57] ABSTRACT

A method for performing address and data transfers among a plurality of different units of a data processing system having a system bus which includes an address bus and a data bus. The system uses arbitration phase, address transfer phase, and data transfer phase operations which require the use of unique handshake signals at each phase so as to permit address and data transfers to occur on a suitable priority basis with respect to different ones of such units in a pipelined manner using non-multiplexed, asynchronous operations.

14 Claims, 6 Drawing Sheets

METHOD AND SYSTEM FOR PROVIDING SUCCESSIVE DATA TRANSFERS AMONG DATA PROCESSING UNITS IN A NON-MULTIPLEXED ASYNCHRONOUS MANNER USING UNIQUE PIPELINED ARBITRATION, ADDRESS, AND DATA PHASE OPERATIONS

This is a continuation of Ser. No. 08/029,884 filed on Mar. 11, 1993, abandoned.

INTRODUCTION

This invention relates generally to data processing systems using multiple processor boards and, more particularly, to such a system which uses a non-multiplexed, asynchronously operated system address/data bus and system bus control which requires unique handshake control signals to be used by units accessing the system bus for handling arbitration phase operations, address transfer phase operations, and data transfer operations on the system bus in a pipelined manner.

BACKGROUND OF THE INVENTION

Many data processing systems use multiple processor boards for permitting the performance of different processing tasks simultaneously by different ones of the system's processors. Such systems require an appropriate commonly used system address/data bus and system bus control for handling address and data transfers between the processors and other units on the bus such as memory units and various input/output (I/O) devices. Such bus systems are normally controlled in a synchronous manner so that the interactions of the operations of such units can be effectively handled on the common bus system. Over time, various units on the bus may be redesigned to provide improved performance characteristics, e.g., the speeds of operation thereof may be improved so that operations can be completed more quickly, there often being several successive generations of such improved components. Such improvements normally require a substantially redesigned bus system in order to provide for the appropriate handling of address and data transfers among units having different operating speeds than those for which the bus system was originally designed.

Moreover, in such synchronously operated systems, arbitration among units competing for access to the bus system for address and data transfers thereon must be completed for each unit in control of the bus before another unit can take control of the bus to perform its task or, alternatively, the operations of different units must be suitably synchronously interleaved so that one unit can make use of the bus system for address transfer, while another unit makes use of the bus for data transfer, neither operations being performed until priority among units competing for access to the bus system has been activated.

It is desirable to provide a bus system and bus control therefor which does not require substantial redesign thereof as improved components become available for use with the bus system so that the bus system and its operation, once designed, can remain usable, and does not become obsolescent, for several successive generations of improved system component designs. Moreover, it is desirable to provide a bus system which can permit arbitration, address transfer, and data transfer operations to occur simultaneously for different processors performing different processing tasks in an efficiently controlled manner.

BRIEF SUMMARY OF THE INVENTION

In accordance with the invention, a multiprocessor data processing system provides for communication between multiple processor boards, memories, and I/O devices via an address/data bus system having suitable bus control for operating the bus system in a non-multiplexed, asynchronous manner. Such operation utilizes unique handshaking control signals which permit a processor to pass from an arbitration phase of its operation to an address transfer phase and thence to a data transfer phase in a manner such that different processors can perform such different phases of their operations with respect to different processing tasks in an effective and efficiently controlled pipelined manner. The use of such an approach permits such a bus system to remain usable without redesign even when processor memory and/or I/O units having improved performance characteristics are subsequently used in the data processing system.

BRIEF DESCRIPTION OF THE INVENTION

The invention can be described in more detail with the help of the accompanying drawings wherein FIG. 1 shows a block diagram of a system in accordance with the invention;

Figure 1:
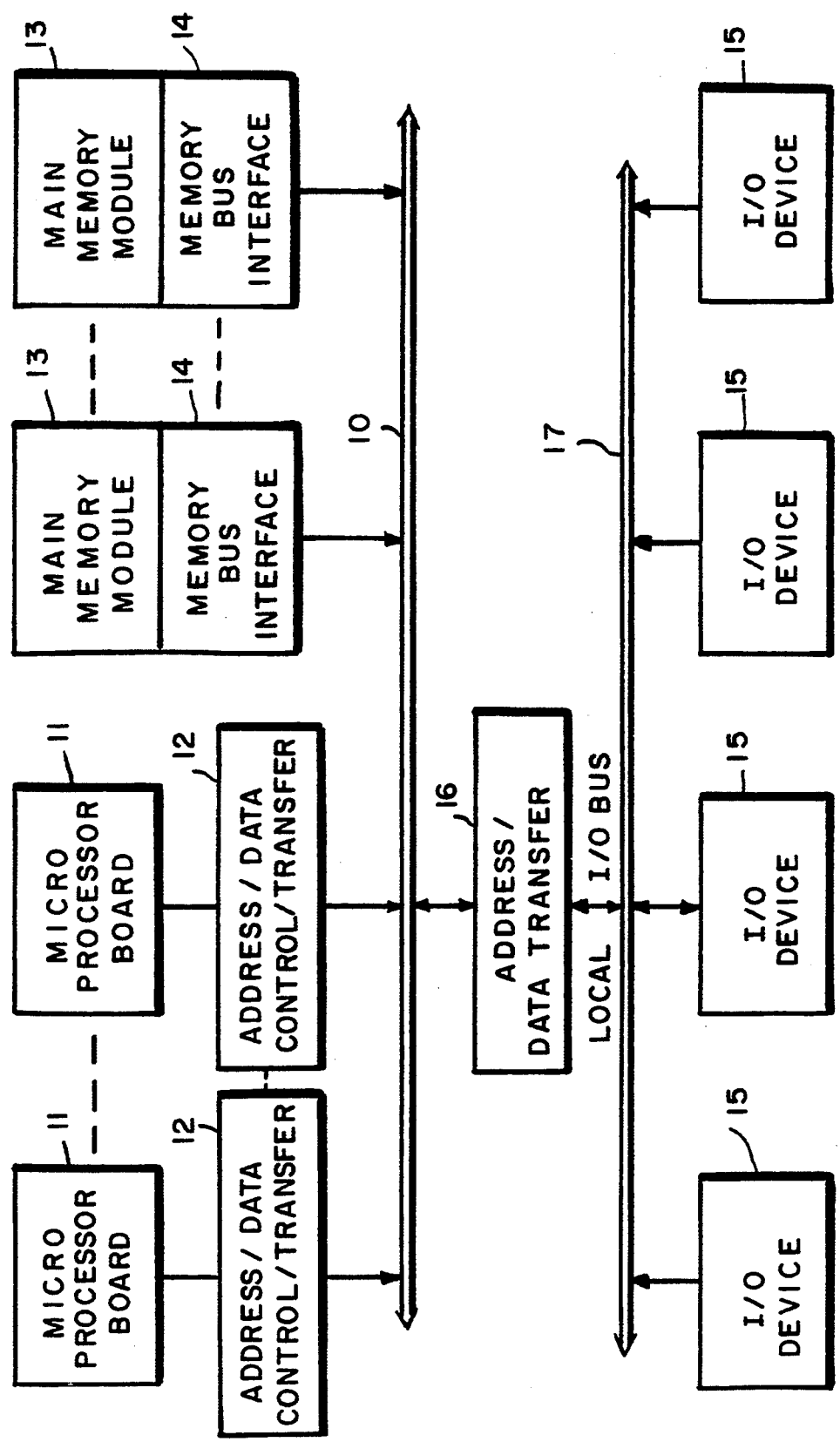

As can be seen in the block diagram of FIG. 1, a system bus 10, in accordance with the invention, is used in the particular embodiment shown for handling address and data transfers between one or more microprocessor boards 11 and one or more main memory modules 13 one or more I/O devices or units 15 via one or more address/data bus control and transfer units 12, each associated with one of the boards 11. Address and data transfers are made on system bus 10 with respect to memory modules 13 via one or more memory bus interface units 14. System bus 10 communicates with I/O devices 15 via an I/O address/data transfer interface unit 16 and a local I/O bus 17.

Figure 2:
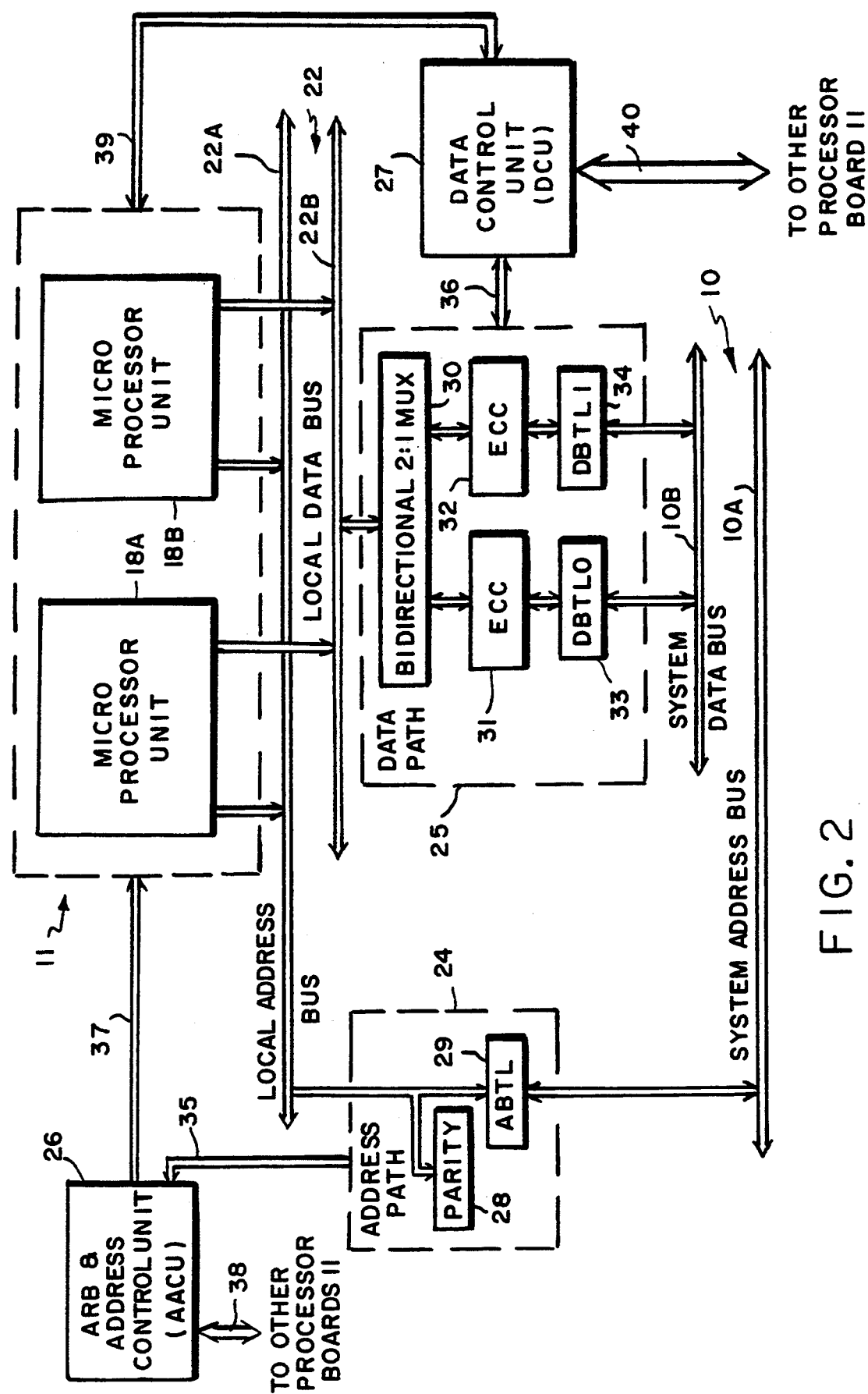
FIG. 2 shows a more detailed block diagram of a portion of the system depicted in FIG. 1.

FIG. 2 shows a more detailed block diagram of a typical processor board 11 which includes a pair of microprocessor units 18A and 18B, each of which can include, for example, a central processor unit, a cache memory, and other associated processing logic units as would be well-known to those in the art.

Processor board 11 represents one of a plurality of processor boards which are in communication with each other via a local bus system 22 comprising a local address bus 22A and a local data bus 22B. The processing boards further communicate via the local bus system 22 with a system has 10 comprising a system address bus 10A and a system data bus 10B. Bus address-/data transfer and control unit 12 of FIG. 1 comprises an arbitration and address control unit (AACU) 26 and a data control unit (DCU) 27 which control, respectively, an address transfer path 24 and a date transfer path 25. Bus address/data transfer and control unit 12 is sometimes referred to as a bus "gasket", which gasket includes address transfer path 24, data transfer path 25, arbitration and address control unit (AACU) 26, and data control unit (DCU) 27. The operation of AACU 26 and DCU 27 are controlled by the processors of microprocessor board 11 via handshake control lines 37 and 39, respectively.

Address path 24 includes parity logic 28 for determining address errors and address bus transceiver logic (ABTL) 29 for transferring, in the particular exemplary embodiment being described, 32-bit addresses from a 32-bit local address bus 22A to a 32-bit system address bus 10A. Operation of address path 24 is controlled by control signals supplied from AACU 26 via control lines 35. Other control signals from AACU 26 and DPU27, on control lines 38 and 40, communicate with other processor board AACU and DCU units of the system.

Data path 25 includes a bidirectional 2:1 multiplexer (MUX) unit 30 which receives two sequentially supplied 64-bit data words from a local 64-bit data bus 22B and provides such two 64-bit data words simultaneously in parallel to a 128-bit system data bus 10B via conventional error checking and correction (ECC) units 31 and 32 and data bus transceiver logic (DBTL) units 33 and 34, respectively, thereby supplying a 128-bit data word to the system data bus 10B. Operation of data path 25 is controlled by control signals from DCU 27 via control lines 36.

Address and data transfers from a processor board 11 to the system address and data bus 10 are discussed in more detail below with reference to the unique handshake signals which are generated, and responded to, by AACU 26 and DCU 27 via handshake control lines 37, 38, 39 and 40 as discussed in more detail below.

The system bus 10 is a non-multiplexed address/data bus which supports multiple processor board requestors, one of which is shown as processor board 11 in FIG. 2, other processor boards 11, also being supported thereby, as shown in FIG. 1. At the time a particular processor board is related to receive access to the system bus 10, such board is designated as a master unit. A master unit must request the use of system bus 10 prior to using it via request lines, as discussed below. System bus 10 is a byte-addressed bus with support, in the specific embodiment described, for byte (8-bit), half-word (16-bit), full-word (32-bit) double- word (64-bit) and quad-word (128-bit) transfers. In a particular embodiment, for example, main memory module address space is supported by 32-bits of byte addresses, i.e., typically a main memory having 4 gigabytes of address space. The system data bus 10B supports 128-bit data transfers.

In accordance with the invention, system bus 10 operates in an asynchronous manner in response to effective techniques for handling address and data transfers among various units of the system, such as processor boards, main memories and I/O devices, such handling techniques remaining usable for many years through many product generation designs, without requiring a redesign of the system bus each time new product improvements occur, thereby reducing the time for marketing improved products which incorporate new and improved technology into a previous product.

The system bus 10 has all the basic functions required in a multiprocessor system that utilizes 32-bit or 64-bit microprocessors and that supports read and write operations for various data sizes (8-bit, 16-bit, 32-bit, and 64-bit sizes). A brief general overview as to how the system bus is used is helpful in understanding the more detailed discussion thereof which then follows.

To use the system bus 10, a potential master must first request a grant of the bus. Once a grant is received, the requestor which is now the selected master unit, asserts an address validation signal via control lines 38 signifying that the master unit is supplying a valid address and drives the address on to the address bus 10A, thus notifying all the other units (now displayed as slave units) on the bus that there is a valid address on the bus. The address phase can result in providing either a valid address or the address, for whatever reason, as in any system, may be invalid. In either case the address phase is completed and the asynchronous pipelined operation continues. During the address phase, the system, if an invalid address occurs, can utilize appropriately known, conventional techniques for handling invalid address problems, as by using suitable fault handling routines. However, the use of such routines does not interfere with the desired pipelined operation. The slave units each appropriately acknowledge the receipt of an address validation signal by driving a suitable acknowledge (N_AACK) signal on their control lines 38. The slave units decode the address presented on the bus by the master unit and drive a response to the address, each informing the master via control lines 38 that they have done so. The master then knows that the address has been checked by all slave units which are capable of responding to the address. Once such check is completed the address master may start its data phase operation and must conclude its address bus phase tenure. The conclusion of its address phase tenure on the address bus will allow another master to gain tenure of the address bus.

In its data phase operation, the master unit informs the slave units via a control line 40 that the data bus is busy and a data source drives data on to the data bus 10B and indicates via a control line 40 to a data destination unit, or units, that there is valid data on the bus. Each data destination unit informs the master unit via a control line 40 when it has taken the first quad word of data, or data beat, from the bus. The phrase "data beat" as used herein refers to 128 bits of data. Subsequent data beats may occur as requested.

Once the requested number of data beats has occurred the data master notifies all of the slaves via a control line 40 that the data bus is no longer busy and then determines that the data phase has been completed successfully.

It is helpful in understanding the asynchronous operation of the system to describe below the various handshake signals which are used by the ACCU 24 and DCU 25 during the arbitration, address, and data phase operations.

N_ABR Address Bus Request

These are a plurality of address bus request control lines in control lines 38, one request line for each of a plurality of potential bus control masters. An address bus request signal is asserted by a potential master to indicate that it has a bus operation pending and remains asserted until the requestor has received an address bus grant signal (below).

N_ABRP Address Bus Request Priority

These are a plurality of high priority request control lines in control lines 38, one for each potential master. This signal is asserted by a potential master to indicate that it has a high priority bus operation pending and remains asserted until the requestor has received an address bus grant signal.

N_ABG Address Bus Grant

These are a plurality of address bus grant control lines in control lines 38, one grant for each request. A grant is asserted in response to an address request and can be issued in accordance with any suitable bus priority algorithm.

ADDR[31:0] Address

This is a 32-bit byte address. It is driven on the address bus 10A by the master concurrently with the assertion of the N_AVAL signal (below) and is maintained until all slave units have acknowledged its receipt.

AITG[3:0] Address Parity

This is a 4-bit address parity bus signal that contains bit per byte parity for the 32-bit address bus. It is driven on to the address bus 10A at the same time as the address.

N_AVAL Address Valid

This signal on a control line 38 indicates a valid address is being driven on the address bus 10A by the bus master. This signal is driven after the address is driven on the address bus 10 by the master. N_AVAL may be asserted when an address bus grant is received by the master if the address bus is available. This signal must be deasserted in response to the assertions of N_AACK (below) and SVAL (below).

SIZE[1:0] Data Size

These signal bits on a control line 40 indicate the amount of data to be transferred on the data bus 10B, as more specifically defined below. These signals have the same timing as the address bus.

BURST Burst

This signal on a control line 40 indicates that a data transfer greater than one doubleword (64-bits) has been requested. BURST is used together with the SIZE bits to indicate the amount of data to be transferred. This signal has the same timing as the address bus.

RD_WR Read/Write

This signal on a control line 40 is unasserted for reads and is asserted for writes. This signal has the same timing as the address bus.

ITM Intent to Modify

This signal on a control line 40 indicates a master's intent to change the data that is being addressed. This signal has the same timing as the address bus.

GBL Global

This signal on a control line 40 indicates that the specified address is encacheable. This signal has the same timing as the address bus.

N_AACK Address Acknowledge

This signal on a control line 38 is deasserted by all slave units whenever N_AVAL is asserted. This signal is asserted by each slave when that slave has detected that a new address phase is starting.

SVAL Status Valid

This signal on control line 38 is deasserted by all slave unit whenever N AVAL is asserted. This signal is asserted by each slave unit after that slave unit has driven its response to the address. The system bus transceiver logic (BTL) uses open collector technology so that the logic creates a suitable control signal so the last slave unit to assert SVAL will allow that signal to be asserted. This signal may be driven active only if the data bus 10B is not busy, i.e. N_DBB is high.

N_ASEL Address Select

This signal is driven on a control line 38 by the slave unit that is responding to the address that is being driven on the bus. This signal must be valid before the assertion of SVAL.

N_SHRD Shared

This signal is driven on a control line 40 by a slave unit to indicate that multiple cache units of processor boards share copies of the data that the bus master is accessing. This signal must be valid before the assertion of SVAL.

N_ARTRY Address Retry

This signal on a control line 38 is driven by a slave unit to force the master back to the arbitration phase. This signal must be valid before with the assertion of SVAL.

N_APE Address Parity Error

This signal on a control line 38 is driven by a slave unit to indicate that parity was incorrect in the current address phase. This signal must be valid before assertion of SVAL.

N_INTV Intervene

This signal on a control line 40 is driven by a slave unit to indicate that it has the requested data in its cache and that it will source the data instead of the addressed memory. This signal must be valid before with the assertion of SVAL.

DATA[127:0] Data

This is the 128-bit data bus signal. These signals are driven by the data source before the Data Strobe signal (below).

DITG[15:0] Data Integrity

This signal contains double bit error detection over the Data bus. It is driven at the same time as data is driven on the data bus.

N_DSTR Data Strobe

This signal is asserted on a control line 40 by the data source to indicate that data on the bus may be sampled. This signal is driven after the DATA bus signals. Both the rising and falling edges of this signal indicate valid data on the bus.

N_DBB Data Bus Busy

This signal is driven on a control line 40 by the address master to indicate that the data phase is active. This signal should be asserted in response to SVAL's being asserted if a data phase is required for the present address phase. This signal should be asserted at the same time that N_AVAL is deasserted and remains asserted until the data phase has been completed.

DACK Data Bus Acknowledge

This signal is driven on a control line 40 by a unit receiving data, i.e., a data sink, to indicate that it has received the data. This signal is driven by the sink in response to the assertion of N DSTR by the data source. This signal is asserted high in response to low N_DSTR and is asserted low in response to high N_DSTR, i.e., opposite to the IDACK signal (below).

N_TRTRY Transaction Retry

This signal is asserted on a control line 40 by a data source or sink to indicate that it can not presently complete the data phase. The source should return to the arbitration phase upon receiving this signal. This signal is driven before N_DSTR (from the source) or before the DACK and IDACK signal (from the sink).

N_TRERR Transaction Error

This signal is asserted on a control line 40 by a data source or sink to indicate that it can not complete the data phase successfully. This signal is asserted before N_DSTR (from the source) or before the DACK and IDACK signal (from the sink).

Whenever a potential master needs to transfer information, it must first gain tenure of the system bus 10. The purpose of the arbitration and address control unit 24 is to restrict tenure of the bus to one master at a time according to any suitable priority algorithm. Since the arbitration and bus acquisition phase, the address phase, and the data phase are separately handled, arbitration and acquisition of the address bus by one master can take place simultaneously with an address transfer by another master and with a data transfer by still another master.

For an arbitration phase, the N_ABR, N_ABRP and N_ABG signals are the arbitration handshake signals required for the system.

A high priority request signal is available for a master that requires immediate access to the system bus 10. An example of this is when a network access is required, since networks have strict latency requirements.

The arbiter will issue a new grant for the first request received, if there is no other grant presently active. If a grant is outstanding and multiple requests are received, a suitable priority algorithm can be used to determine which request should be granted first.

To insure that the arbiter does not issue incorrect grants, there is a compelled handshaking relationship between requests and grants, i.e., a new request should not be asserted until the prior grant has been deasserted and a request should never be deasserted until a grant has been issued for that request.

If a requestor for some reason does not want to become the address bus master, it still must maintain its request until a grant is issued. If a requestor wants to become address bus master, there are compelled handshake signals that must occur between the start of the address phase and the deassertion of the request therefor, i.e., a request by a master may not be deasserted until the slave units have asserted Address Acknowledge (N_AACK) in response to the master's assertion of N AVAL.

A master can retain tenure of the system bus 10 by keeping its request asserted after receiving a grant. This will allow a master to have exclusive access to the bus, i.e., it is said to park on the bus, for special circumstances, such as for indivisible, e.g., read-modify-write, operations.

Figure 3:
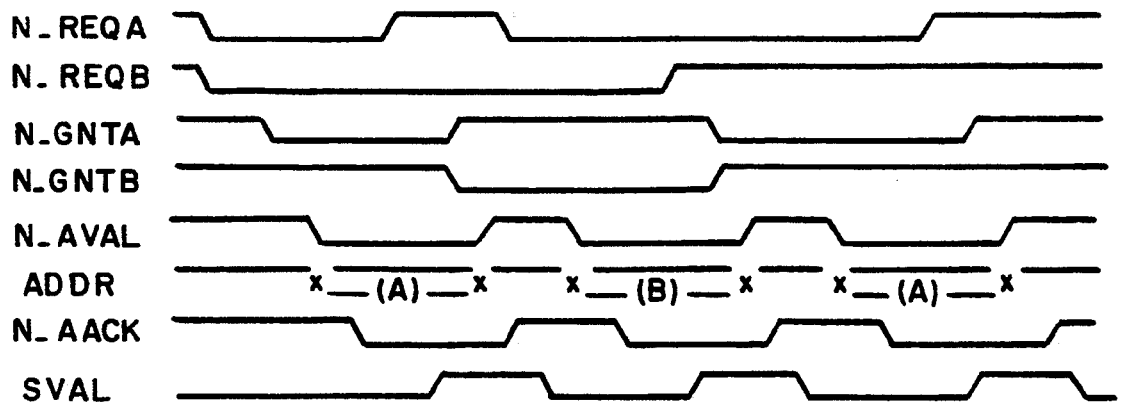
FIG. 3 shows timing diagrams for various signals used during an exemplary arbitration phase operation of the invention.

In order to maintain fairness between different bus requestors, masters should not retain tenure of the bus 10 unless absolutely necessary. An address/data control and transfer unit 12 that represents more than one requestor of a plurality of requestors who reside on the same processor board should deassert its bus request after gaining tenure for the first requestor on that processor board, even if the second requestor on the same board has its request asserted. Control unit 12 for that board may reassert a bus request after the bus grant has been deasserted. Such operation will enforce fairness among processor boards, since the arbiter will have an opportunity to issue a grant to a different address/data control transfer unit of a different processor board when the first requestor's grant is deasserted. A timing diagram showing an exemplary arbitration operation for two competing requestors A and B is depicted in FIG. 3.

The system bus 10 address phase begins when a requestor receives a grant and the prior address phase has been completed (N_AACK is inactive and SVAL is inactive). When a requestor observes these conditions, it may become the address bus master by driving the bus address lines and the bus address control lines including Address Valid (N_AVAL).

All slave units respond to the assertion of N_AVAL by asserting their Address Acknowledge (N_AACK) signal. If an address bus master needs to perform only one bus transaction, it may deassert its request after receiving N_AACK. If an address bus master wants to park on the bus, it should maintain its request until it starts its last bus transaction.

All slave units respond to the N_AVAL by driving one of their address status lines, i.e., Shared (N_SHRD), Intervene (N INTV), Retry (N_ARTRY), Address Parity Error (N_APE), and Address Selected (N_ASEL). These lines must be valid when each slave unit asserts SVAL so that when the last slave unit asserts SVAL, the response on the status lines will be valid. SVAL may only be asserted if the data bus is not busy (N_DBB is not asserted).

When the last slave unit asserts SVAL, the master will assert N_DBB if there is a data phase for this address phase and will deassert N_AVAL. When N_AVAL is deasserted, all interested parties should be prepared for the data phase (if there is one). The further discussion below defines the acceptable slave responses in an address phase and the resulting transaction that will occur during the data phase. All slaves will respond to N_AVAL's being deasserted by deasserting N_AACK. Once the last slave unit has deasserted N_AACK, all slave units may deassert SVAL and their status signals that have previously been asserted.

Figure 4:
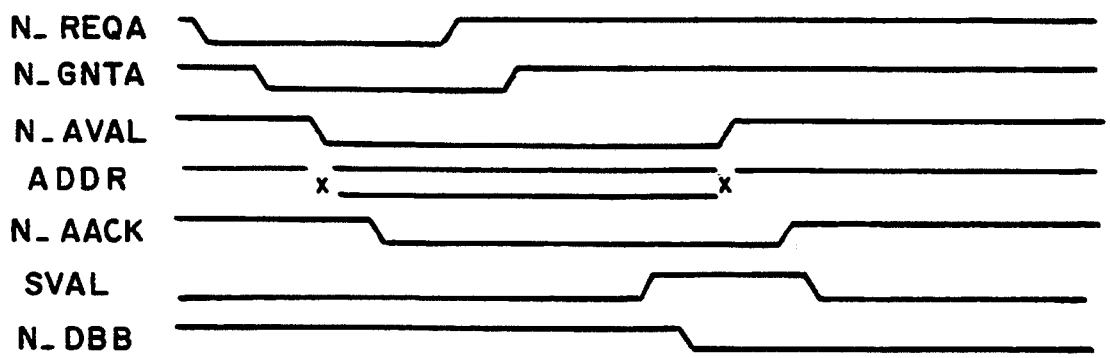
FIGS. 4, 5 and 6 show timing diagrams of various signals at successive stages of an exemplary address phase operation of the invention.
Figure 5:
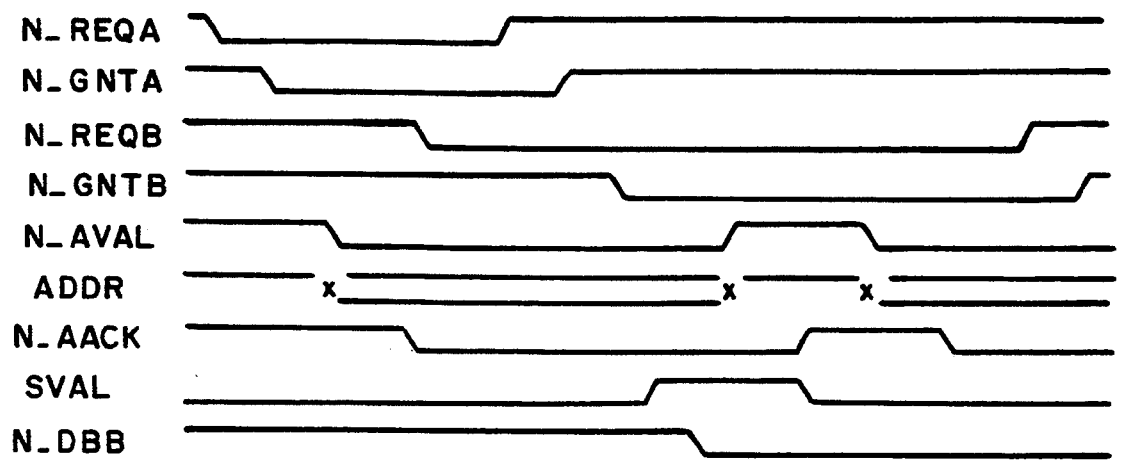
Figure 6:
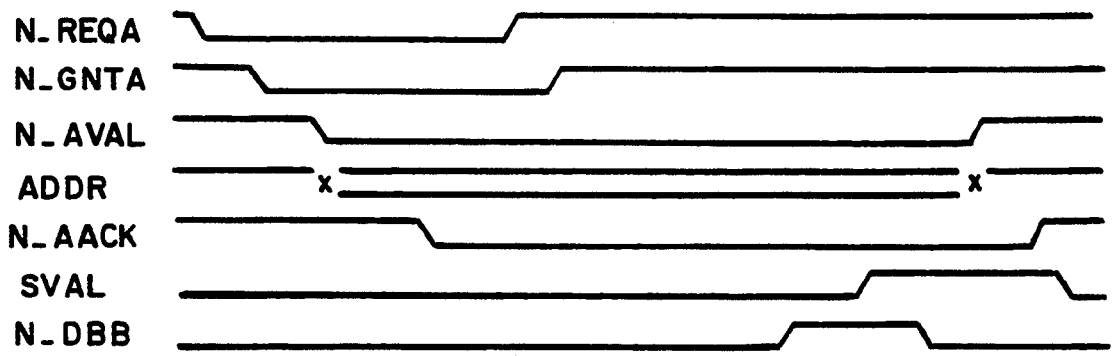

If another master has been granted the address bus during the present master's tenure, the new master will wait until SVAL is deasserted before reasserting N_AVAL and starting the next address phase. Various examples of address phase handshaking are shown in the timing diagrams of FIGS. 4, 5 and 6.

The system bus 10 data phase begins when the address master asserts a Data Bus Busy (N_DBB) signal. The data source asserts a Data Strobe signal (N_DSTR) low and drives valid data on the data bus. The data source must continue driving the N-DBB and N-DSTR signals until the data sink, or sinks, have asserted both Data Acknowledge signals valid, i.e., DACK is high, which signals the successful receipt of the data.

If the requested data size was 128-bits or less (one "data beat" or less on the bus), the data transfer would be complete at this point, but the N_DSTR, DACK signals are in invalid states for the start of the next data phase, so that one additional second handshake signal must occur to drive those signals back to their nominal states. No data will be transferred with the second handshake signal so the data integrity bits should not be checked. Once the second handshake is completed, N_DBB will be deasserted which will allow a new data phase to begin if another address phase has been initiated.

If the requested data size was greater than 128-bits, a second data beat would be started by the data source as a result of the acknowledge signals becoming valid. The data source will begin the second data beat by asserting N_DSTR high and driving valid data on the data bus. The data sink, or sinks, would complete this data beat by driving the Data Acknowledge signals to their next valid state, i.e., DACK is driven low and N_DACK is driven high. Data beats continue until all of the requested data is transferred. When the final Data Acknowledge has been received, the Master samples the Transaction Status signals (N TRTRY and N_TRERR) and deasserts N_DBB which will allow a new data phase to begin if another address phase has been initiated.

Between data phases, all slaves must assert DACK to its nominal state. In other words, when N_DBB is deasserted, all slave units must assert DACK low until N_DBB is reasserted. At that time, only the slave units involved in the data phase of the present transaction will continue to drive DACK. Various examples of data phase handshaking are shown in FIGS. 7, 8, 9 and 10 as further described below.

Figure 11:
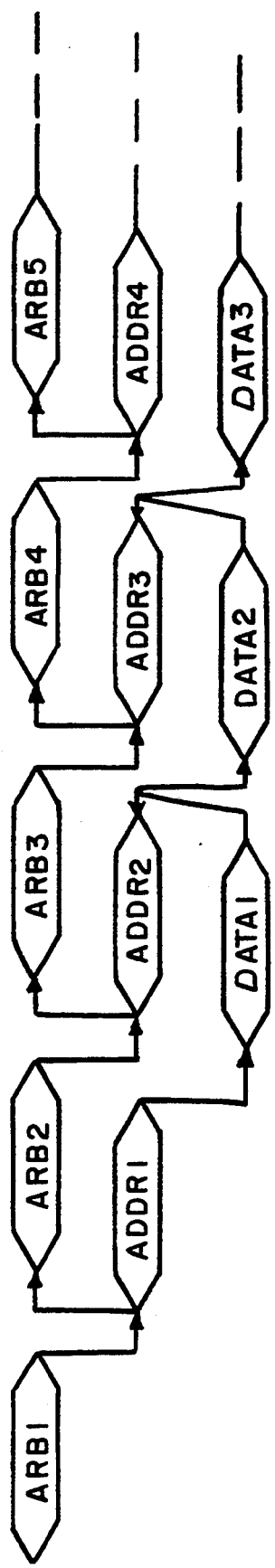
FIG. 11 depicts in diagrammatic form the independent, asynchronous nature of the arbitration, address and data phase operations and the pipelined nature of such operation for successively selected requesting units.

It is helpful in understanding the operation of the system to consider the presentation of the arbitration, address, and data phase as pipelined operations for a series of different requestors, as depicted diagrammatically in FIG. 11.

As seen therein, during a first arbitration phase (ARB 1) a first requestor deemed to have priority is granted access to the address bus (ADDR 1). A second arbitration phase (ARB 2) can then begin while the first requestor has placed an address on the address bus. The first requestor places data on the bus (DATA 1) and in the second arbitration phase a second requestor deemed to have priority for a next address phase is selected, which second requestor then places an address on the address bus (ADDR 2). A third arbitration phase (ABR 3) can then begin.

At the end of the previous data phase (DATA 1), the second requestor can place its data on the date bus (DATA 2). In the third arbitration phase a third requestor deemed to have address priority is selected so that the third requestor can then place an address on the address bus (ADDR 3) and a fourth arbitration phase (ARB 4) can then begin. The third requestor places its data on the data bus (DATA 3) and a fourth requestor deemed to have address priority is then selected in the fourth arbitration phase (ARB 4) which fourth requestor can then place an address on the address bus (ADDR 4). The next arbitration phase (ARB 5) then begins and the pipelined operation continues, as shown.

Thus, FIG. 11 illustrates independent, asynchronous nature of the, arbitration, address, and data phase operations and the pipelined nature of the operations for each of successive requestors.

Figure 7:
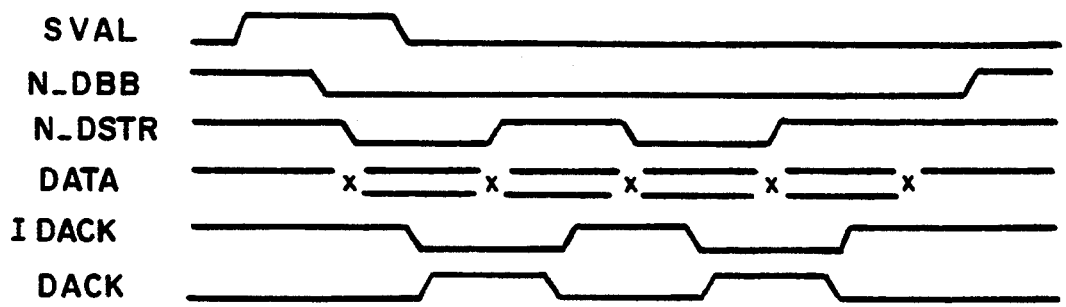
FIGS. 7, 8, 9 and 10 show timing diagrams of various signals at successive stages of an exemplary data phase operation of the invention.
Figure 8:
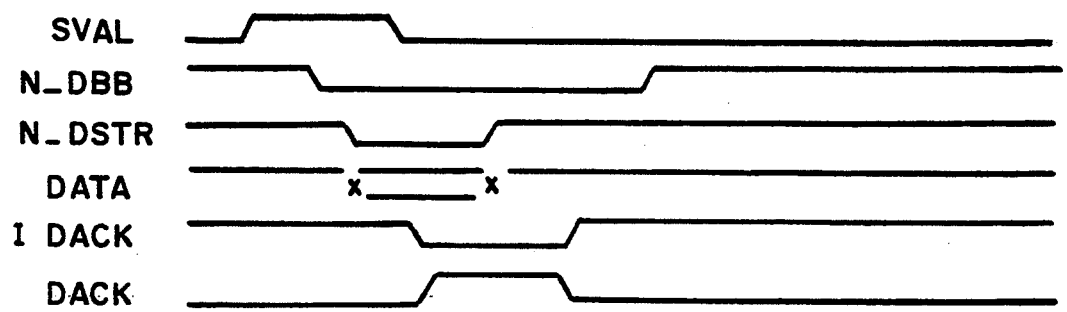

In a particular embodiment of the invention, a standard data phase consists of 4 data beats which in the embodiment being described is the cache line size, i.e., 64 bytes. The timing diagram shown in FIG. 7 illustrates a 4 data beat transfer. The timing diagram of FIG. 8 illustrates a single data beat transfer in a data phase.

Figure 9:
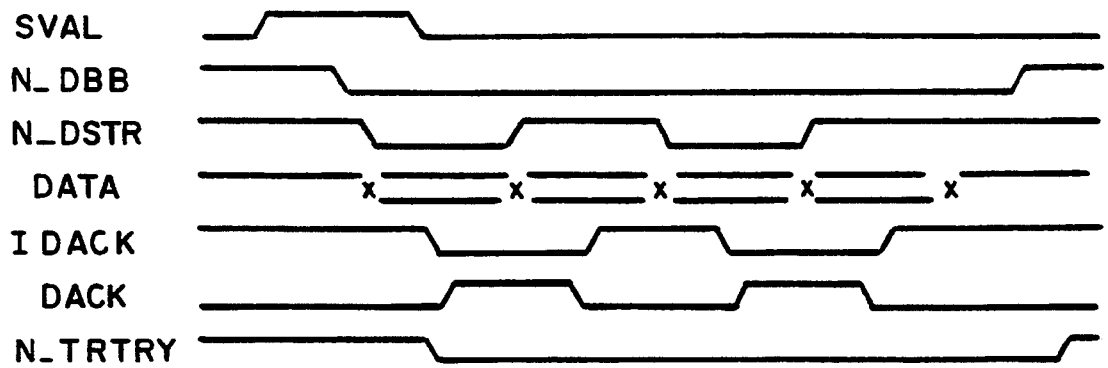

Transaction Retry (N_TRTRY) may be asserted by a slave during the data phase of a bus transaction. If the slave is receiving data (a bus write operation) the slave must assert N TRTRY before DACK. If the slave is supplying data (a bus read operation), the slave must asserts N_TRTRY before N-DSTR. Upon receiving N_TRTRY, the master allows the data phase to complete then reasserts N_ABR to retry the entire bus transaction. The diagram of FIG. 9 illustrates this operation.

Figure 10:
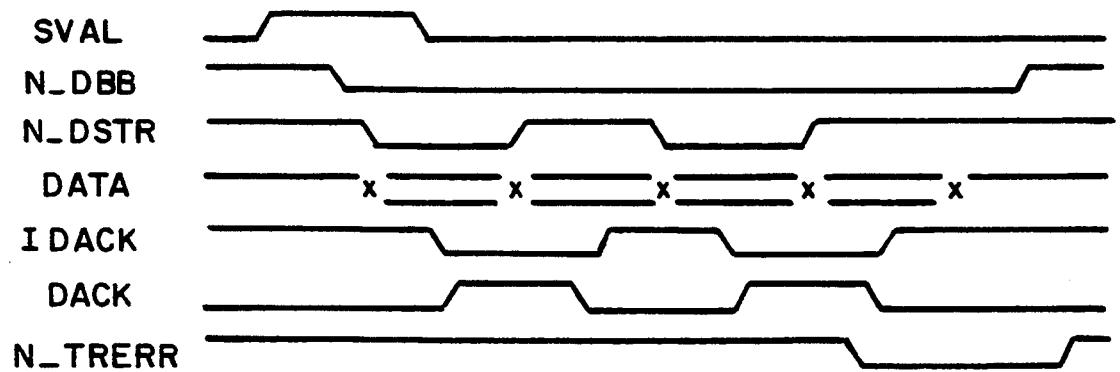

Transaction Error (N_TTRERR) may be asserted by a slave during the data phase of a bus transaction. If the slave is receiving data (a bus write operation), the slave must assert N TRERR before N_DSTR. Upon receiving N_TRERR, the master allows the data phase to complete and then handles the error condition locally. The diagram of FIG. 10 illustrates this operation.

The rules for handshaking control operation for the arbitration phase, address transfer phase, and data transfer phase are set forth below.

ARBITRATION HANDSHAKING

N_ABR may be asserted if a local request is asserted AND N ABG is NOT asserted.

N_ABR must be deasserted if N_ABG is asserted AND address bus mastership is NOT required.

N_-ABR may be deasserted by a unit if N_ABG is asserted AND the unit's N_AVAL is asserted AND N AACK is asserted.

N_ABRP may be asserted if a local request is asserted AND N-ABG is NOT asserted.

N_ABRP must be deasserted if N_ABG is asserted AND address bus mastership is NOT required.

N_ABRP may be deasserted by a unit if N_ABG is asserted AND the unit's N_AVAL is asserted and N_AACK is asserted.

N_ABG may be asserted if N_ABR OR N_ABRP is asserted.

N_ABG must be deasserted if N_ABR AND N_ABRP are deasserted.

ADDRESS MASTER HANDSHAKING

N_AVAL may be asserted by a unit if N_ABG is asserted AND SVAL is deasserted AND the unit's bus gasket is driving valid address and control on the bus.

N_AVAL must be deasserted if N_AACK is asserted AND SVAL is asserted AND N_DBB is asserted AND there is a corresponding data phase for the present address phase OR if N_AACK is asserted AND SVAL is asserted AND there is NO corresponding data phase for the present address phase.

DATA MASTER HANDSHAKING

N_DBB must be asserted if N_AACK is asserted AND SVAL is asserted AND DACK is deasserted AND a data phase is required for the current address phase.

N_DBB must be deasserted after transfer of two data beats have been completed (DACK has returned to its nominal stat) if 256 bits of data or less were specified during the address phase.

N_DBB must be deasserted after transfer of four data beats having been completed (DACK has returned to its nominal state for the second time) if 512 bits of data were specified during the address phase.

ADDRESS SLAVE HANDSHAKING

N_AACK must be asserted if N_AVAL is asserted.

N_AACK must be deasserted if N_AVAL is deasserted.

SVAL must be asserted by the slave unit if N_AVAL is asserted AND the slave unit's bus gasket is driving a valid address status on the bus.

SVAL must be deasserted if N_AVAL is deasserting AND N_AACK is deasserted.

DATA SOURCE HANDSHAKING

N_DSTR must be asserted if SVAL is deasserted AND a data phase is required for the current address phase AND data source's bus gasket is driving the first data beat OR if a second data beat transfer has been completed (i.e., DACK has returned to a deasserted state) AND more than 256 bits of data are required to be transferred AND the source's bus gasket is driving the third data beat on the bus.

N_DSTR must be deasserted if the first data beat transfer has completed (i.e., DACK is asserted) AND the data source's bus gasket is driving the bus with the second data beat OR if a third data bet a transfer has completed (i.e., DACK has returned to the asserted state) and more than 256 bits of data are required to be transferred AND the source's bus gasket is driving the four data beat on the backpanel.

DATA DESTINATION (SINK) HANDSHAKING

DACK must be asserted if the first data beat has been received OR if more than 256 bits of data are returned to be transferred AND the third data beat has been received.

DACK must be deasserted if the second data beat has been received OR if more than 256 bits of data are required to be transferred AND the fourth data beat has been received.

DACK must be asserted if the second data beat has been received OR if more than 256 bits of data are required to be transferred AND the fourth data beat has been received.

DACK must be deasserted if the first data beat has been received OR if more than 256 bits of data are required to be transferred AND the third data beat has been received.

OTHER DATA PHASE HANDSHAKING

DACK must be asserted by all slaves when N_DBB is deasserted.

DACK must be deasserted by all slaves that are not involved in the present data phase when N_DBB is asserted.

While the above description discusses a typical embodiment of the invention, modifications thereof within the spirit and scope of the invention may occur to those in the art. Hence, the invention is not to be construed as limited thereto, except as defined by the appended claims.

What is claimed is:

1. A method for performing asynchronous address and data transfers among a plurality of different operating units of a data processing system having a system bus which includes an address bus for transferring addresses and a data bus for transferring data between data source units and data destination units of said operating units in communication with said system bus, said method comprising:

selecting, under control of arbitration circuitry, during a first arbitration phase operation, a first one of a plurality of operating units which may be simultaneously requesting access to said system bus as a first master unit;

supplying a first arbitration handshake signal granting access to the address bus to said first master unit and indicating the end of said first arbitration phase operation and the beginning of a first address phase operation for said system bus;

supplying from said first master unit a first address handshake signal during said first address phase operation and supplying an address to said address bus;

supplying first address return handshake signals from each of said other units which operate as slave units acknowledging the supplying of said address and indicating the end of said first address phase operation and the beginning of a first data phase operation for said system bus;

supplying from said first master unit a first data handshake signal to permit a data source to supply data to said data bus;

supplying from said data source a first data source handshake signal and supplying data to said data bus; and supplying first data return handshake signals from one or more data destination units acknowledging the receipt of data and indicating the end of said first data phase operation for said system bus.

2. A method in accordance with claim 1 and further including, during said arbitration phase operation, the steps of asserting on one or more bus request control lines one or more bus request signals by one or more operating units requesting access to said system bus;

determining the priorities of said requesting units, selecting one of said requesting units as said first selected master unit, all units other than said first master unit thereby being slave units; and asserting a bus grant signal as said arbitration handshake signal to indicate grant of access to said first selected master unit, the end of said first arbitration phase operation and the beginning of said first address phase operation.

3. A method in accordance with claims 1 or 2 and further including selecting a second requesting unit as a second master unit for a second arbitration phase operation following the first arbitration phase operation and the beginning of said first address phase operation;

supplying a second arbitration handshake signal granting access to the address bus to said second master unit and indicating the end of the second arbitration phase operation and the beginning of a second address phase operation for said system bus;

supplying from said second master unit a second address handshake signal during said second address phase operation and supplying an address to said address bus;

supplying from said second master unit a second data handshake signal to permit a second data source to supply data to the data bus;

supplying from said second data source a second data source handshake signal and supplying data to said data bus; and supplying second data return handshake signals from one or more second data destination units acknowledging the receipt of data and indicating the end of said second data phase operation for said system bus;

whereby the first arbitration phase, the first address phase, the second arbitration phase, the first data phase, the second address phase and the second data phase occur in an asynchronous pipelined manner.

4. A method in accordance with claim 3 and further including supplying arbitration, address and data handshake signals and addresses and data with respect to successive selected master units in the same manner as with respect to said first and second selected master units so that the arbitration phase operations, the address phase operations, and the data phase operations of three successive master units occur simultaneously in an asynchronous, pipelined manner.

5. A method in accordance with claim 4 and further including selecting successive requesting units as said successive master units having said simultaneous arbitration phase, address phase and data phase operations; and asserting an address valid signal as an address handshake signal by a selected master unit if no status valid signal is asserted by a slave unit.

6. A method in accordance with claim 5 and further including asserting an acknowledge signal as a return address handshake signal by each slave unit when receiving said address valid signal; and asserting a status valid signal by a selected slave unit that has responded to the address driven on the address bus; and de-asserting said address valid signal by said master unit when said selected slave unit has asserted a status valid signal.

7. A method in accordance with claim 6 and further including asserting a data bus busy signal as a data handshake signal by said master unit when said selected slave unit has asserted its acknowledge signal and its status valid signal; and driving data from a data source unit on to said data bus.

8. A method in accordance with claim 7 and further including asserting a data acknowledge signal as a data return handshake signal by a data destination unit when data driven on said data bus has been received by said data destination unit; and de-asserting said data bus busy signal after said data destination unit asserts a data acknowledge signal.

9. A method in accordance with claim 8 wherein said data bus busy signal is de-asserted when a first selected number of beats of data have been transferred and a first selected number of data bits, or less, were specified for transfer.

10. A method in accordance with claim 9 wherein said first selected number of data beats is two and said first selected number of data bits is 256 bits.

11. A method in accordance with claim 8 wherein said data bus busy signal is de-asserted when a second selected number of beats of data have been transferred and a second selected number of bits were specified for transfer.

12. A method in accordance with claim 11 wherein said second selected number of data beats is four and said second selected number of data bits is 512 bits.

13. A data processing system requiring address and data transfers among a plurality of different operating units, said system comprising:

an asynchronously operating system bus means which includes an address bus for transferring addresses and a data bus for transferring data between data source units and data destination units in communication with said system bus means;

arbitration means operative during a first arbitration phase of said system bus means for selecting one of a plurality of operating units which may be simultaneously requesting access to said system bus means as a first master unit;

said arbitration means supplying a first arbitration handshake signal granting access to the address bus by said first master unit and indicating the end of said first arbitration phase and the beginning of a first address phase for said system bus means;

said first master unit operative during a first address phase of said system bus means for supplying a first address handshake signal and for supplying an address to said address bus;

each operating unit supplying further a first address return handshake signal acknowledging the supplying of said address and indicating the end of said first address phase and the beginning of a first data phase of said system bus means;

said first master unit operative during the first data phase of said system bus means for supplying a first data handshake signal to permit a first data source unit to supply data to said data bus;

said first data source unit supplying data to said data bus; and one or more first data destination units supplying first data return handshake signals acknowledging receipt of said data and indicating the end of said data phase.

14. A data processing system in accordance with claim 13 wherein said arbitration means selects successive master units and grants successive accesses by said successive master units to said address bus;

said successive master units supply successive addresses to said address bus; and said successive master Units permit successive data to be supplied to said data bus by successive data source units and to be received by successive one or more data destination units:

whereby said arbitration handshake signals, said address handshake signals, said data handshake signals, said addresses and said data are successively supplied in a manner such that successive arbitration phase, address phase, and data phase operations for said successive selected master units occur in an asynchronous, pipelined manner.

* * * * *